(12) United States Patent
Yeh (10) Patent No.: US 10,474,196 B2
(45) Date of Patent: Nov. 12, 2019

(54) DISPLAY DEVICE

(71) Applicant: Wuhan China Star Optoelectronics Semiconductor Display Technology Co., Ltd., Wuhan, Hubei (CN)

(72) Inventor: Shang-Hung Yeh, Guangdong (CN)

(73) Assignee: Wuhan China Star Optoelectronics Semiconductor Display Technology Co., Ltd., Wuhan, Hubei (CN)

( * ) Notice: Subject to any disclaimer, the term of this patent is extended or adjusted under 35 U.S.C. 154(b) by 41 days.

(21) Appl. No.: 15/736,687

(22) PCT Filed: Oct. 20, 2017

(86) PCT No.: PCT/CN2017/106980
§ 371 (c)(1),
(2) Date: Dec. 14, 2017

(87) PCT Pub. No.: WO2019/029010
PCT Pub. Date: Feb. 14, 2019

(65) Prior Publication Data
US 2019/0041913 A1    Feb. 7, 2019

(30) Foreign Application Priority Data

Aug. 7, 2017   (CN) .......................... 2017 1 0674522

(51) Int. Cl.
*G06F 1/16*   (2006.01)
(52) U.S. Cl.
CPC .......... *G06F 1/1652* (2013.01); *G06F 1/1616* (2013.01); *G06F 1/1641* (2013.01); *G06F 1/1647* (2013.01)

(58) Field of Classification Search
CPC .... G06F 1/1652; G06F 1/1616; G06F 1/1681; G06F 1/1626; G06F 1/1647; G06F 1/1641
See application file for complete search history.

(56) References Cited

U.S. PATENT DOCUMENTS 9,173,288 B1   10/2015   Kim
2014/0111954 A1   4/2014   Lee et al.
(Continued)

FOREIGN PATENT DOCUMENTS

CN            106601130 A       4/2017

*Primary Examiner* — Dimary S Lopez Cruz
*Assistant Examiner* — Ingrid D Wright
(74) *Attorney, Agent, or Firm* — Andrew C. Cheng (57) ABSTRACT

The present invention provides a display device including a housing assembly, a connective frame, a link, and a flexible screen. The housing assembly includes middle frames and housings pivotally connected with each other. The connective frame includes a pivotal connector pivotally connected with the housings. The link is pivotally connected with the middle frames and the pivotal connector. The flexible screen is set on surfaces of the middle frames. When the housings are folded and the middle frames approach the housings, the interval between the second ends of the two middle frames is greater than that of the first ends of the two middle frames. The present invention causes bending perimeter of the folding region of the flexible screen being increased to release the stress. Thus, it can avoid breakage or wrinkle after the display device is folded and improve reliability of the display device.

14 Claims, 7 Drawing Sheets

(56) References Cited

U.S. PATENT DOCUMENTS

2015/0361696 A1 12/2015 Tazbaz
2016/0295709 A1 10/2016 Ahn
2017/0115701 A1\* 4/2017 Bae ...................... G06F 1/1652

\* cited by examiner

DISPLAY DEVICE

FIELD OF THE DISCLOSURE

The present invention relates to display field, and more particularly, to a display device.

BACKGROUND

The current display device of a flat display panel such as Liquid Crystal Display (LCD), Organic Light-Emitting Diode (OLED) display, or Plasma Display Panel (PDP) are mainly used in notebook computers, portable electronic equipment and so on. With the increasing demand for large screen in portable electronic devices, the flat display panel having large-screen display units and able to be connected with is being developed and commercialized. In particular, the foldable display device draws more attention due to its portability, with the advantage of the bendable or foldable flexible display panels.

The inventor of the present application has found in the long research that the flexible OLED display panel is light-weight, non-friable, foldable, and so on, and is often adopted as a flexible screen for the display device. However, after the foldable display panel is folded, the stress is over concentrated at the folding area to cause breakage or wrinkle.

SUMMARY

The present invention provides a display device to solve the problem of breakage or wrinkle after the display device being folded.

For solving the problem above, the present invention adopts an embodiment providing a display device including: a housing assembly including two housings and two middle frames, wherein first ends of the middle frame are pivotally connected with first ends of the housings; a connective frame including a pivotal connector, wherein second ends of the two housings are pivotally connected with the pivotal connector; a link including a first end pivotally connected with one of the two middle frames, and a second end pivotally connected with an eccentric of the pivotal connector; and a flexible screen on surfaces of the two middle frames; wherein the second ends of the two middle frames approach the second ends of the housings when the two housings are rotationally folded relative to the connective frame such that interval between the second ends of the two middle frames is greater than that of the first ends of the two middle frames, and bending perimeter of a folding region of the flexible screen is increased to release the stress.

The display device of the present invention includes the pivotal connector and the link to pivotally connecting the housing assembly. The interval between the second ends of the two middle frames is greater than that of the first ends of the two middle frames so bending perimeter of the folding region of the flexible screen is increased to release the stress. It can avoid breakage or wrinkle after the display device is folded and improve reliability of the display device

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

The specific structural and functional details disclosed herein are only representative and are intended for describing exemplary embodiments of the disclosure. However, the disclosure can be embodied in many forms of substitution, and should not be interpreted as merely limited to the embodiments described herein.

In the description of the disclosure, terms such as "center", "transverse", "above", "below", "left", "right", "vertical", "horizontal", "top", "bottom", "inside", "outside", etc. for indicating orientations or positional relationships refer to orientations or positional relationships as shown in the drawings; the terms are for the purpose of illustrating the disclosure and simplifying the description rather than indicating or implying the device or element must have a certain orientation and be structured or operated by the certain orientation, and therefore cannot be regarded as limitation with respect to the disclosure. Moreover, terms such as "first" and "second" are merely for the purpose of illustration and cannot be understood as indicating or implying the relative importance or implicitly indicating the number of the technical feature. Therefore, features defined by "first" and "second" can explicitly or implicitly include one or more the features. In the description of the disclosure, unless otherwise indicated, the meaning of "plural" is two or more than two. In addition, the term "comprise" and any variations thereof are meant to cover a non-exclusive inclusion.

In the description of the disclosure, is should be noted that, unless otherwise clearly stated and limited, terms "mounted", "connected with" and "connected to" should be understood broadly, for instance, can be a fixed connection, a detachable connection or an integral connection; can be a mechanical connection, can also be an electrical connection; can be a direct connection, can also be an indirect connection by an intermediary, can be an internal communication of two elements. A person skilled in the art can understand concrete meanings of the terms in the disclosure as per specific circumstances.

The terms used herein are only for illustrating concrete embodiments rather than limiting the exemplary embodiments. Unless otherwise indicated in the content, singular forms "a" and "an" also include plural. Moreover, the terms "comprise" and/or "include" define the existence of described features, integers, steps, operations, units and/or components, but do not exclude the existence or addition of one or more other features, integers, steps, operations, units, components and/or combinations thereof.

The disclosure will be further described in detail with reference to accompanying drawings and preferred embodiments as follows.

Figure 1:
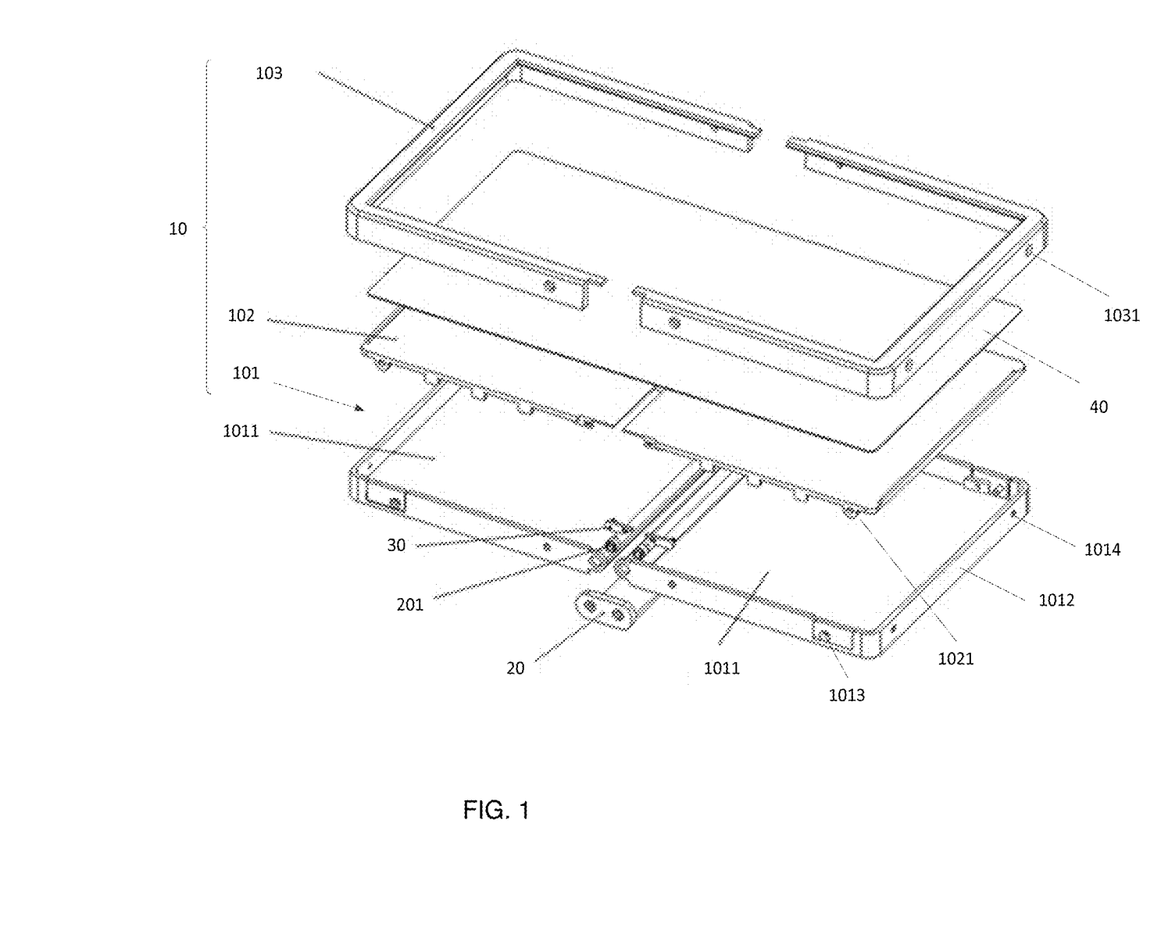
FIG. 1 is an exploded view of a display device in accordance with an embodiment of the present invention.
Figure 2:
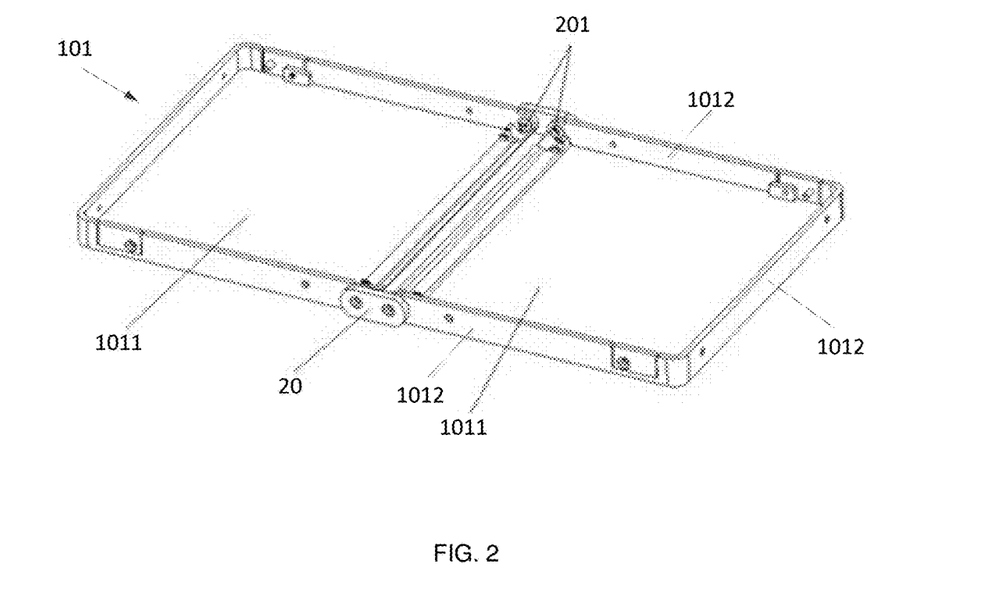
FIG. 2 is a schematic view of a housing and a connective frame of a display device in accordance with an embodiment of the present invention.
Figure 3:
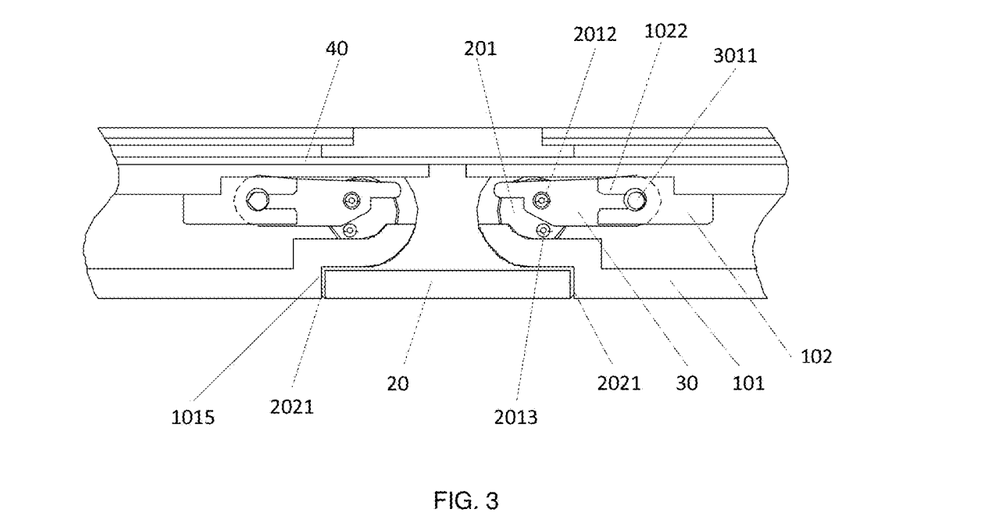
FIG. 3 is a cross-sectional view of an initial state of a display device in accordance with an embodiment of the present invention.

Referring FIGS. 1 and 2, an embodiment of the present invention includes a housing assembly 10 including two housings 101 and two middle frames 102. The first ends of the middle frame 102 are pivotally connected with the first ends of the housings 101. Optionally, the housing 101 can be made of plastic or metal A connective frame 20 has a pivotal connector 201. The second ends of the two housings 101 are pivotally connected with the pivotal connector 201.

In this embodiment, the first ends of the two housings 101 and the first ends of the two middle frames 102 are close to one end of the edge of the display device; and the second ends of the two housings 101 and the second ends of the two middle frames 102 are close to one end of a folding region.

A link 30 includes a first end pivotally connected with at least one of the two middle frames 102, and a second end pivotally connected with an eccentric of the pivotal connector 201.

A flexible screen 40 is set on surfaces of the two middle frames 102.

Optionally, the flexible screen 40 can be a flexible organic light-emitting screen, a flexible electrophoretic screen, a flexible liquid crystal screen, or a flexible electrowetting screen.

The second ends of the two middle frames 102 approach the second ends of the housings 101 when the two housings 101 are rotationally folded relative to the connective frame 20 such that the interval between the second ends of the two middle frames 102 is greater than that of the first ends of the two middle frames 102. Thus, bending perimeter of the folding region of the flexible screen 40 is increased to release the stress.

In this embodiment, the two housings 101 respectively include a bottom wall 1011 and a side wall 1012 connected with the bottom wall 1011. The two middle frames 102 are respectively set relative to the bottom walls 1011 of the two housings 101. The first ends of the two middle frames 102 include first mounting holes 1021, and the side walls 1011 of the two housings 101 include second mounting holes 1013. The first mounting holes 1021 and the second mounting holes 1013 are fixed by fixing members (not shown) so the two housings 101 are pivotally connected with the two middle frames 102. The distance between the two middle frames 102 and the bottom walls 1011 is greater than zero so the two housings 101 can move along a direction vertical to the bottom walls 1011 and the distance between the second ends of the two middle frames 102 and the bottom walls 1011 is reduced when the two housings 101 are rotationally folded relative to the connective frame 20.

Optionally, the two housings 101 further includes a plurality of third mounting holes 1014. The display device further includes two front frames 103. The front frames 103 include a plurality of forth mounting holes 1031 corresponding to the plurality of third mounting holes 1014. The plurality of third mounting holes 1014 and the plurality of forth mounting holes 1031 are fixed by fixing members (not shown) so the two housings 101 are pivotally connected with the two front frames 103.

Optionally, shapes of the first mounting hole 1021, the second mounting hole 1013, the third mounting hole 1014, and the forth mounting hole 1031 can be circle, square, or other shapes. They also can be screw holes of circle, square, or other shapes. The fixing member can be a screw or a bolt. The first mounting hole 1021 and the second mounting hole 1013 can be structures which buckles to each other. One of them is a mounting column and the other is a mounting hole. The third mounting hole 1014 and the forth mounting hole 1031 can be structures which buckles to each other as well.

Referring FIGS. 1 to 6, the pivotal connector 201 includes a pivot portion 2011, a mounting post 2012 and a confining post 2013 set on one side of the pivot portion 2011, and a fool-proof portion 2014 set on the other side of the pivot portion 2011. The link 30 includes a main body 301 and an extension 302 set on a second end of the main body 301. A first end of the link 30 includes a pivot post 3011, and a second end of the link 30 includes a hinge 3012 corresponding to the mounting post 2012. The connective frame 20 includes a substrate 202 and two lateral plates 203 perpendicular to two sides of the substrate 202. The two lateral plates 203 include shaped mounting holes 2031 corresponding to the fool-proof portion 2014. Second ends of the middle frames 102 include fifth mounting holes 1022 corresponding to the pivot post 3011.

Specifically, the pivot portion 2011 is pivotally connected with the housings 101; the mounting post 2012 is pivotally connected with the hinge 3012; the confining post 2013 resists the link 30; the fool-proof portion 2014 fixes the shaped mounting holes 2031; and the pivot post 3011 is pivotally connected with the fifth mounting hole 1022. The extension 302 resists the confining post 2013 to stop the link 30 rotating relative to the pivotal connector 201 when the two housings 101 rotate to be folded relative to the connective frame 20 and the link 30 rotates to a predetermined angle.

Optionally, the shape of the fifth mounting hole 1022 can be circle, square, or other shapes. It can be a notch as well.

Figure 7:
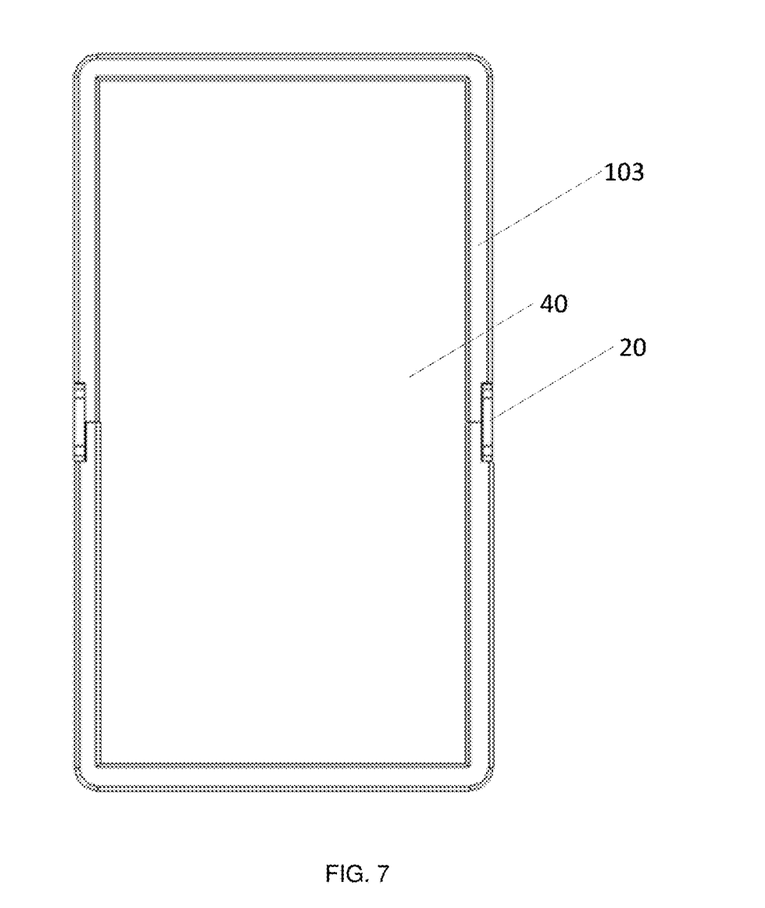
FIG. 7 is a top view of an initial state of a display device in accordance with an embodiment of the present invention.
Figure 8:
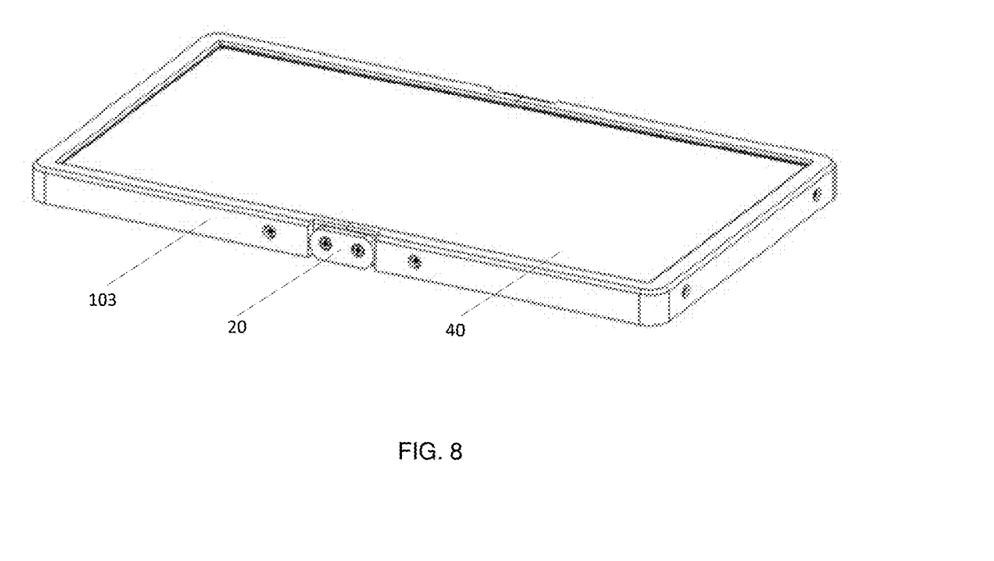
FIG. 8 is a schematic view of a stereoscopic structure of an initial state of a display device in accordance with an embodiment of the present invention.

The substrate 202 of the connective frame 20 includes two lateral sides 2021. Second ends of the two housing 101 include resisting faces 1015. At initial state of the display device, the two lateral sides 2021 of the substrate 202 respectively resist the resisting faces 1015 of the two housing 101 so the flexible screen 40 and the whole display device present unfolded state as shown in FIGS. 7 and 8.

The mounting post 2012 and the confining post 2013 are located on a side of the pivotal connector 201 close to the lateral side 2021 of the connective frame 20.

Figure 4:
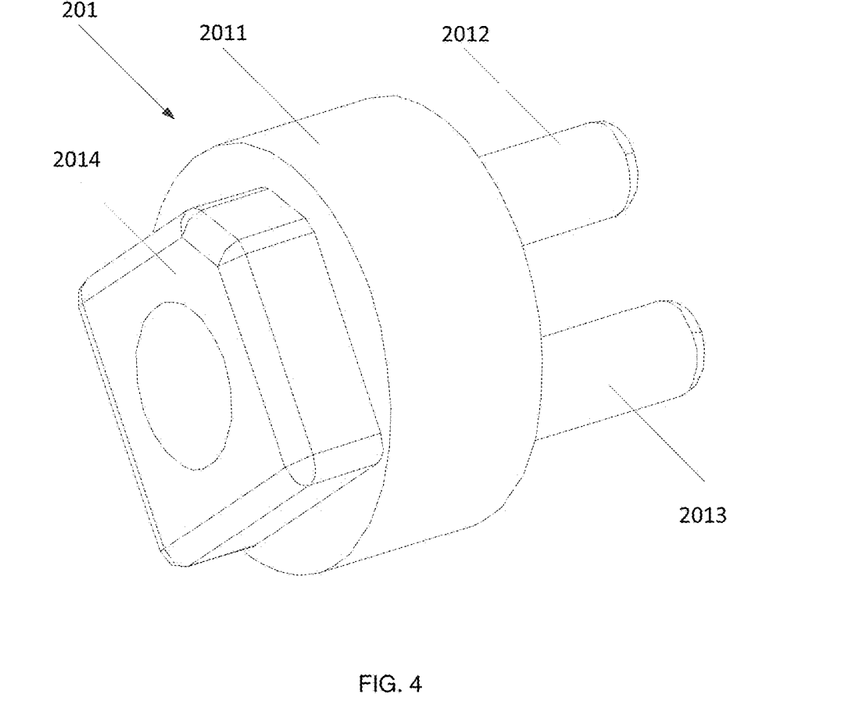
FIG. 4 is a schematic view of a pivotal connector of a display device in accordance with an embodiment of the present invention.
Figure 5:
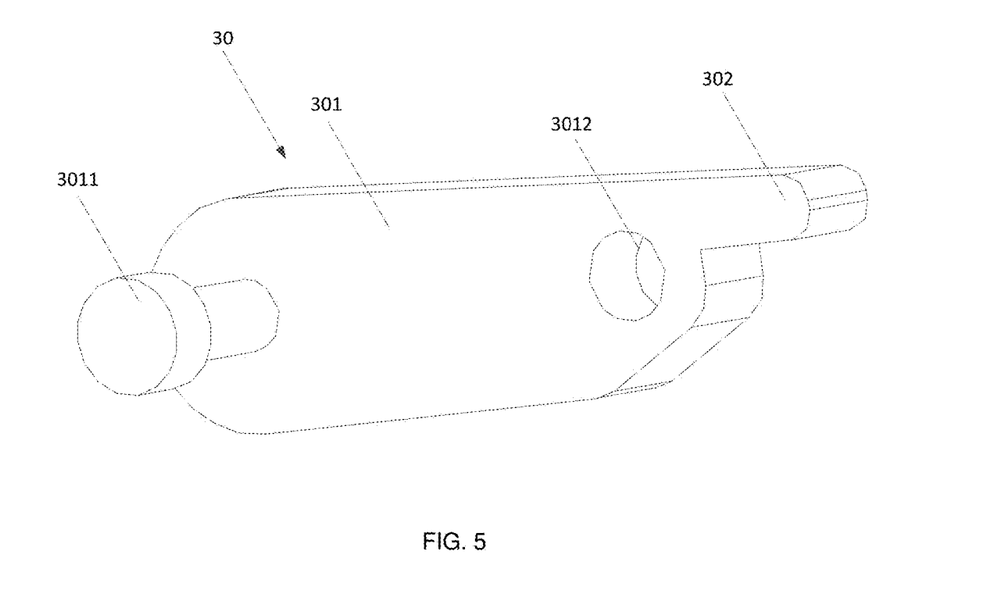
FIG. 5 is a schematic view of a link of a display device in accordance with an embodiment of the present invention.
Figure 6:
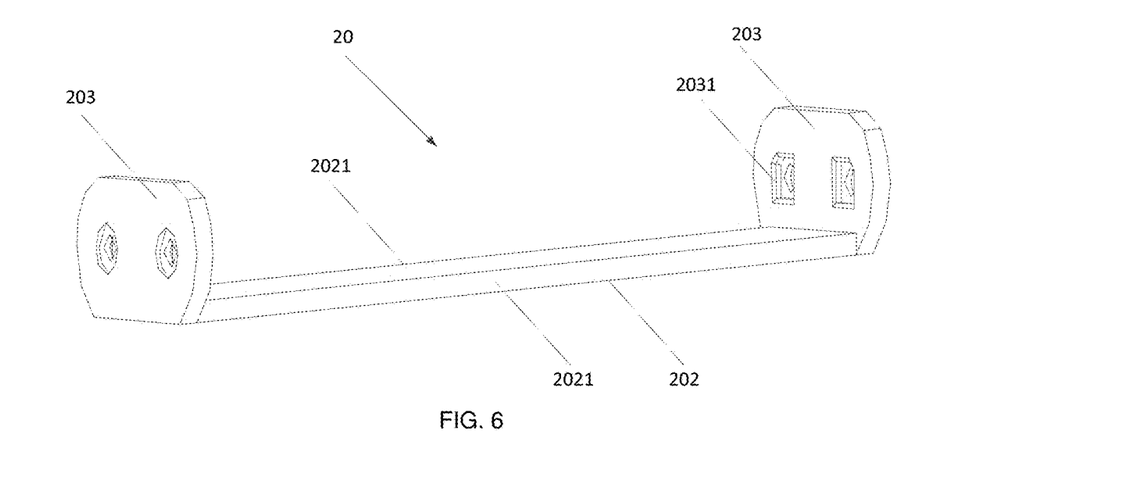
FIG. 6 is a schematic view of the connective frame of a display device in accordance with an embodiment of the present invention.
Figure 9:
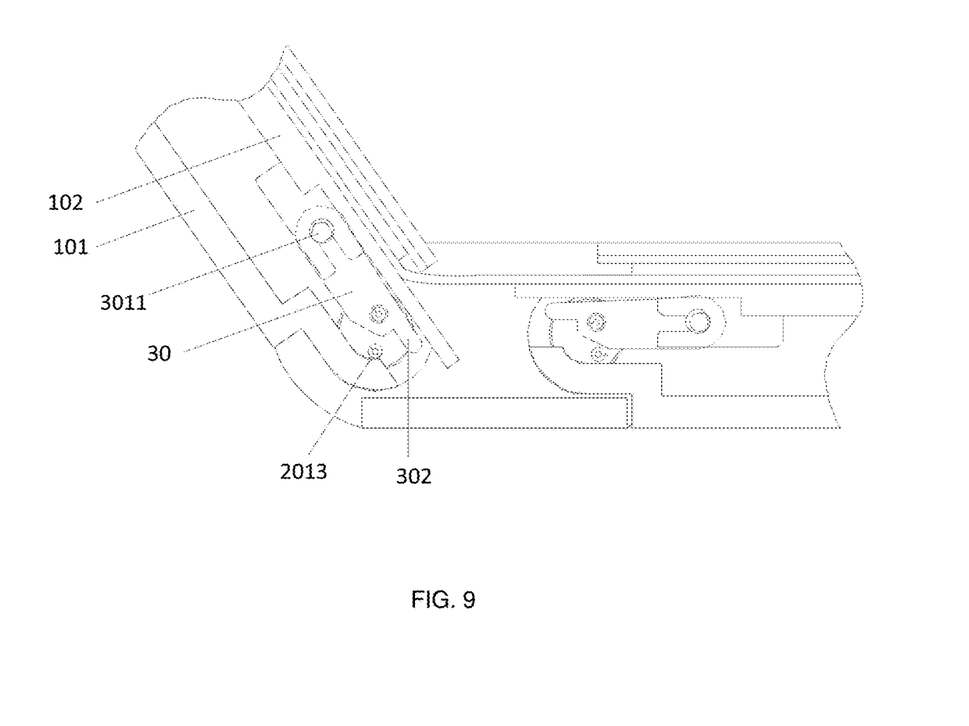
FIG. 9 is a cross-sectional view of a folding process of a display device in accordance with an embodiment of the present invention.
Figure 10:
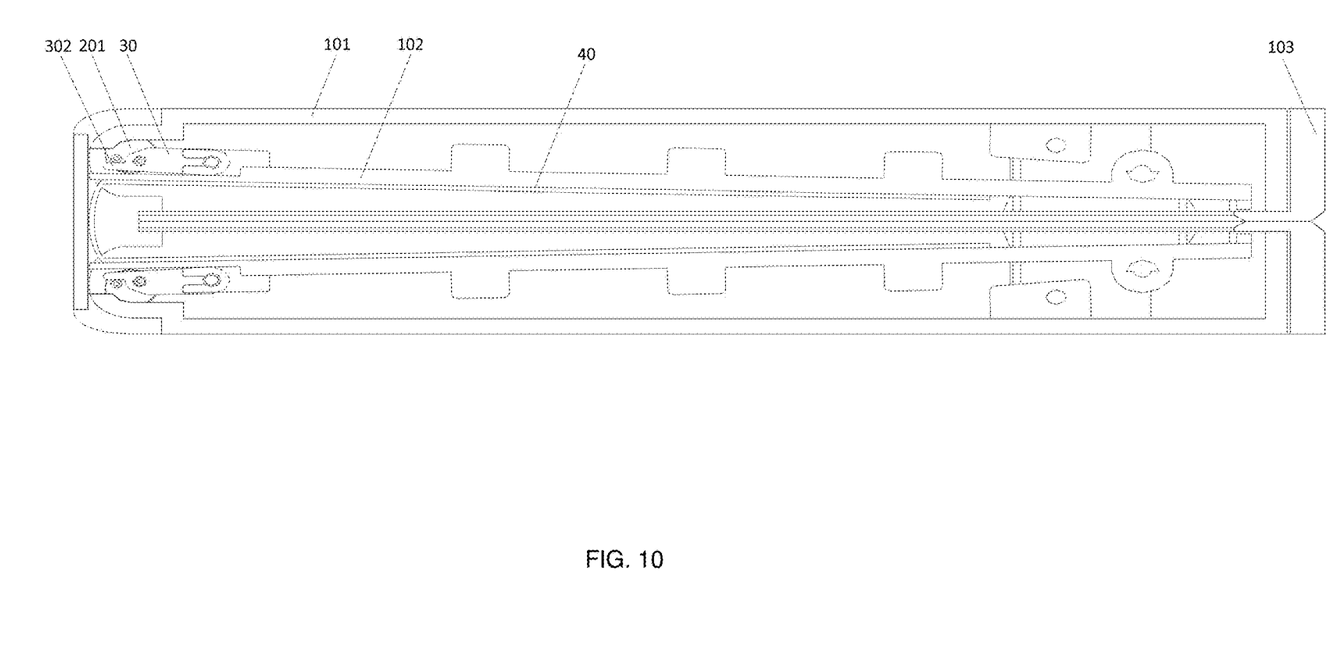
FIG. 10 is a cross-sectional view of a folding state of a display device in accordance with an embodiment of the present invention.
Figure 11:
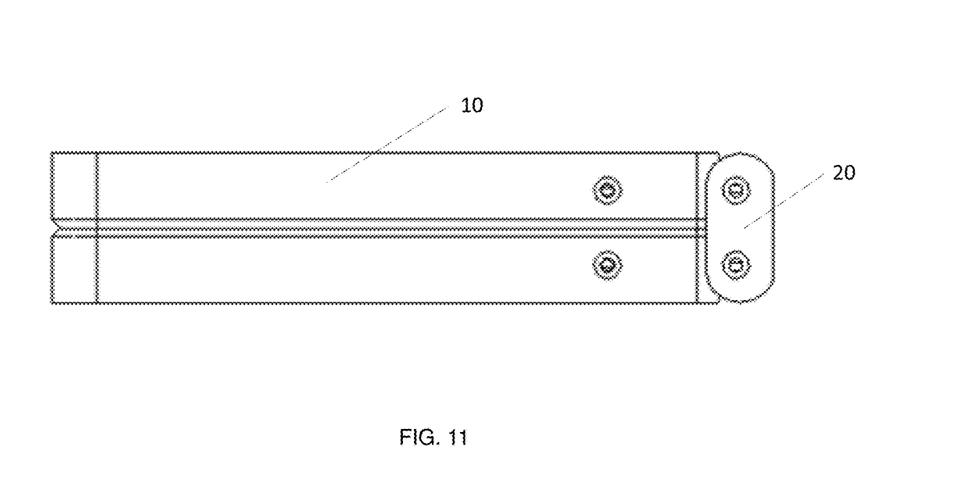
FIG. 11 is a front view of a folding state of a display device in accordance with an embodiment of the present invention.
Figure 12:
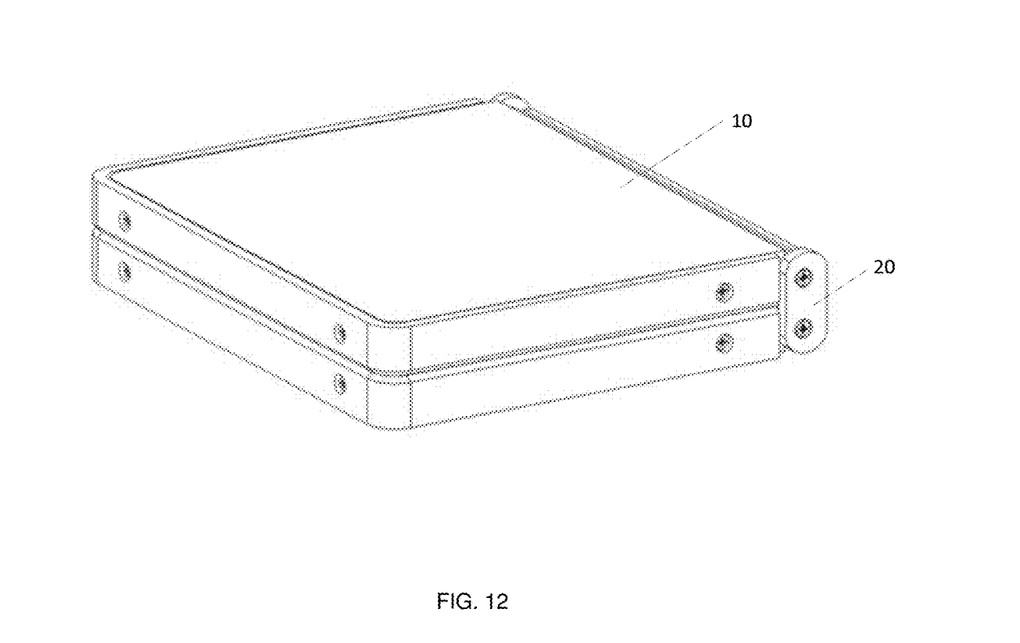
FIG. 12 is a perspective view of a stereoscopic structure of a folding state of a display device in accordance with an embodiment of the present invention.

Referring FIGS. 4, 9, and 10, the pivot portion 2011 of the pivotal connector 201 is a circular column. The display device starts to be bent from the unfolded state. At least one of the housings 101 of the housing assembly 10 starts to rotate around the center of a circle of the pivot portion 2011 of the pivotal connector 201 pivotally connected with the housing 101. When the middle frame 102 rotates to a predetermined angle along the housing 101, the extension 302 of the link 30 resists the confining post 2013 to stop the link 30 rotating relative to the pivotal connector 201 and pull the middle frame 102 by the pivot post 3011. The middle frame 102 keeps rotating relative to the pivotal connector 201 to cause that the second end of the middle frame 102 resists the second end of the housing 101 until surfaces of the two front frames 103 contacts to each other, and a projection of the two housing 101 overlaps that of the two middle frame 10 on the horizontal plane, and the display devices presents the folded state, as shown in FIGS. 11 and 12. The interval between the second ends of the two middle frames 102 is greater than that of the first ends of the b two middle frames 102. Thus, bending perimeter of the folding region of the flexible screen 40 is increased to release the stress.

Optionally, the predetermined angle is less than 90°.

The embodiment of the present invention provides the display device including the pivotal connector and the link and pivotally connecting the housing assembly. When the two housings of the housing assembly are rotationally folded relative to the connective frame such that the interval between the second ends of the two middle frames is greater than that of the first ends of the two middle frames. Thus, bending perimeter of the folding region of the flexible screen is increased to release the stress. It avoids breakage or wrinkle after the display device is folded, and improve reliability of the display device.

It is noted that it expands dimension of the layer and the region for clear in the figures. It is understood that each layer is not limited in one element and can include multiple elements. In addition, it is understood that when the element or the layer is on "one side" of another element or another layer, it can be on other elements directly or exist at the middle layer.

The foregoing contents are detailed description of the disclosure in conjunction with specific preferred embodiments and concrete embodiments of the disclosure are not limited to these description. For the person skilled in the art of the disclosure, without departing from the concept of the disclosure, simple deductions or substitutions can be made and should be included in the protection scope of the application.

What is claimed is:

1. A display device, comprising:
a housing assembly comprising two housings and two middle frames, wherein first ends of the middle frame are pivotally connected with first ends of the housings;
a connective frame comprising a pivotal connector, wherein second ends of the two housings are pivotally connected with the pivotal connector;
a link comprising a first end pivotally connected with one of the two middle frames, and a second end pivotally connected with an eccentric of the pivotal connector; and
a flexible screen on surfaces of the two middle frames;
wherein second ends of the two middle frames approach the second ends of the housings when the two housings are rotationally folded relative to the connective frame such that interval between the second ends of the two middle frames is greater than that of the first ends of the two middle frames, and bending perimeter of a folding region of the flexible screen is increased to release the stress;

the pivotal connector comprises a pivotal portion, a mounting post and a confining post on a side of the pivot portion, the pivot portion is pivotally connected with the housings, the mounting post is pivotally connected with the second end of the link, and the confining post resists the link; and the two housings respectively comprise a bottom wall and a side wall connected with the bottom wall, the two middle frames are respectively set relative to the bottom walls of the two housings, and distance between the second ends of the two middle frames and the bottom walls is reduced when the two housings are folded;

the link comprises a main body and an extension, a pivot post on a first end of the link and connected with the middle frame, and a hinge on a second end of the link and connected with the mounting post, and the extension is on a second end of the main body and resists the confining post to stop the link rotating relative to the pivotal connector when the link rotates to a predetermined angle.

2. The display device of claim 1, wherein the pivotal connector comprises a fool-proof portion on the other side of the pivot portion, fixing the connective frame.

3. The display device of claim 2, wherein the connective frame comprises a substrate and two lateral plates perpendicular to two sides of the substrate, and the two lateral plates comprise shaped mounting holes to fix the fool-proof portion.

4. The display device of claim 3, wherein the substrate comprises two lateral sides, second ends of the two housing comprise resisting faces, and the two lateral sides respectively resist the resisting faces.

5. The display device of claim 3, wherein the first ends of the two middle frames comprise first mounting holes, and the side walls of the two housings respectively comprise second mounting holes, and the first mounting holes and the second mounting holes are fixed by fixing members so the two housings are pivotally connected with the two middle frames.

6. The display device of claim 2, wherein the predetermined angle is less than 90°.

7. The display device of claim 1, wherein the mounting post and the confining post are located on a side of the pivotal connector close to a lateral side of the connective frame.

8. A display device, comprising:
a housing assembly comprising two housings and two middle frames, wherein first ends of the middle frame are pivotally connected with first ends of the housings;
a connective frame comprising a pivotal connector, wherein second ends of the two housings are pivotally connected with the pivotal connector;
a link comprising a first end pivotally connected with one of the two middle frames, and a second end pivotally connected with an eccentric of the pivotal connector; and
a flexible screen on surfaces of the two middle frames;
wherein the second ends of the two middle frames approach the second ends of the housings when the two housings are rotationally folded relative to the connective frame such that interval between the second ends of the two middle frames is greater than that of the first ends of the two middle frames, and bending perimeter of a folding region of the flexible screen is increased to release the stress;

the pivotal connector comprises a pivot portion, a mounting post and a confining post on a side of the pivot portion, the pivot portion is pivotally connected with the housings, the mounting post is pivotally connected with a second end of the link, and the confining post resists the link;

the link comprises a main body and an extension, a pivot post on a first end of the link and connected with the middle frame, and a hinge on a second end of the link and connected with the mounting post, and the extension is on a second end of the main body and resists the confining post to stop the link rotating relative to the pivotal connector when the link rotates to a predetermined angle.

9. The display device of claim 8, wherein the pivotal connector comprises a fool-proof portion on the other side of the pivot portion, fixing the connective frame.

10. The display device of claim 9, wherein the connective frame comprises a substrate and two lateral plates perpendicular to two sides of the substrate, and the two lateral plates comprise shaped mounting holes to fix the fool-proof portion.

11. The display device of claim 10, wherein the substrate comprises two lateral sides, second ends of the two housing comprise resisting faces, and the two lateral sides respectively resist the resisting faces.

12. The display device of claim 10, wherein the first ends of the two middle frames comprise first mounting holes, and the side walls of the two housings respectively comprise second mounting holes, and the first mounting holes and the second mounting holes are fixed by fixing members so the two housings are pivotally connected with the two middle frames.

13. The display device of claim 9, wherein the predetermined angle is less than 90°.

14. The display device of claim 8, wherein the mounting post and the confining post are located on a side of the pivotal connector close to a lateral side of the connective frame.

* * * * *